United States Patent [19]
Sui

[11] Patent Number: 5,421,271
[45] Date of Patent: Jun. 6, 1995

[54] TURNTABLE EQUIPPED WITH AN ELECTRICAL RECEPTACLE

[76] Inventor: Huang L. Sui, No. 23, Yu Ai Road, Chia-Yee City, Taiwan, Prov. of China

[21] Appl. No.: 189,842
[22] Filed: Feb. 1, 1994
[51] Int. Cl.[6] .............................................. A47B 35/00
[52] U.S. Cl. .......................................... 108/50; 108/20
[58] Field of Search .................. 108/50, 94, 103, 104, 108/20, 21, 22; 312/236, 241.2, 305, 125, 135

[56] References Cited
U.S. PATENT DOCUMENTS

| | | | |
|---|---|---|---|
| 1,534,557 | 4/1925 | Williams | 108/20 |
| 2,890,088 | 6/1959 | Lepry et al. | 108/20 |
| 4,500,150 | 2/1985 | Leibensperger et al. | 108/50 X |
| 5,152,099 | 10/1992 | Nilssen | 108/21 X |
| 5,231,562 | 7/1993 | Pierce et al. | 108/50 X |

*Primary Examiner*—Jose V. Chen
*Attorney, Agent, or Firm*—Morton J. Rosenberg; David I. Klein

[57] ABSTRACT

A turntable table having an electrical receptacle which receives current from a standard wall outlet through conductors carried by the turntable and an associated bracket frame to transfer the voltage to an electrical appliance. The turntable can also be controlled by an electric system to rotate the turntable through touch.

7 Claims, 13 Drawing Sheets

TURNTABLE EQUIPPED WITH AN ELECTRICAL RECEPTACLE

FIELD OF THE INVENTION

This invention relates to a turntable, and more particularly to a turntable equipped with an electrical receptacle thereon.

BACKGROUND OF THE INVENTION

Most chinese food restaurants are equipped with big round tables having turntables on top of the turntables for people to pick the meal from each dish without requiring to stand up to reach the dish or to ask somone to pass the food. The turntables therefore named "Lazy Susan".

Figure 14:
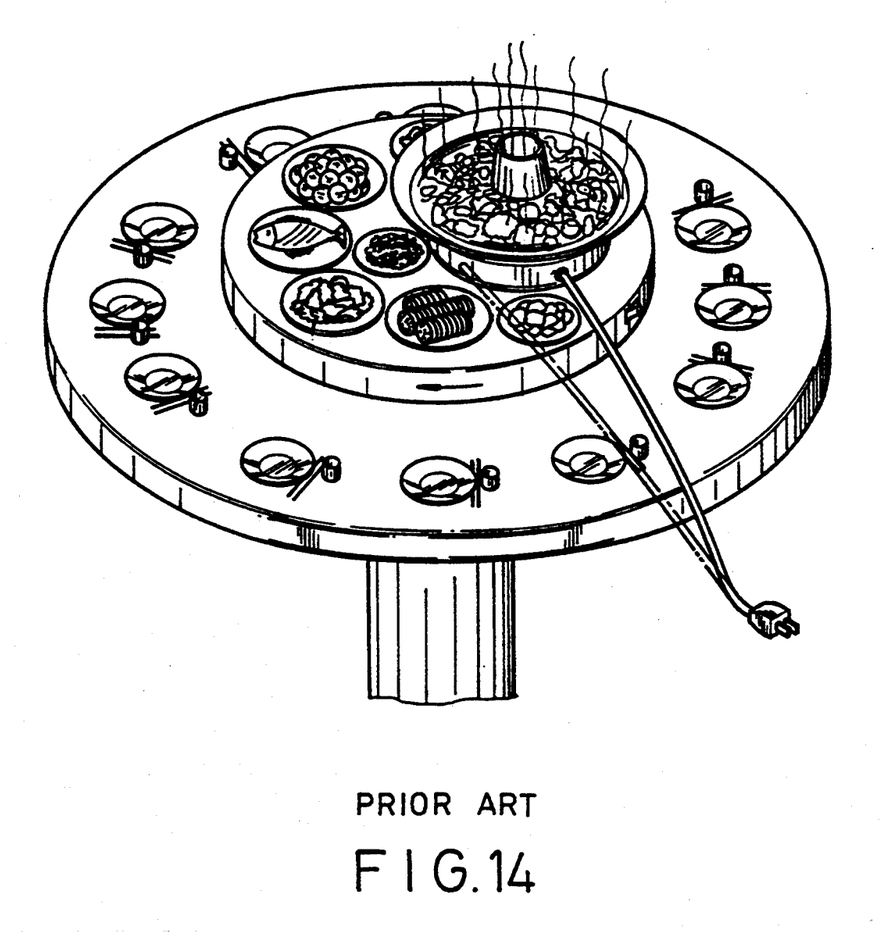
FIG. 14 is a turntable of a prior art.

One of the many parpular chinese dishs is so called "fire pot" which uses a pot to boil water for people to cook vegetables or raw meat in it for themselves to eat. Such a pot is generaly heated either by burning solid alcohols or by indoor wall electrical outlet. The solid alcohol has a limited time of burning and requires to be replenished frequently. In order to use the indoor wall outlet (as shown in FIG. 14), the pot requires an extension cord to reach the wall outlet. However, the cord may be inconvenient to the person seating next thereto and may even cause accident.

The inventor, in view of this, has invented the present invention which is convenient in use and more reliable.

SUMMARY OF THE INVENTION

It is the primary object of the present invention to provide a turntable equipped with an electrical receptacle which has a receptacle installed on a turntable to provide electrical power to an electrical pot.

It is another object of the present invention to provide a turntable equipped with an electrical receptacle which is safe and convenient in use.

It is a further object of the present invention to provide a turntable equipped with an electrical receptacle which is more reliable.

It is still a further object of the present invention to provide a turntable equipped with an electrical receptacle which is easy to use.

DETAILED DESCRIPTION OF THE DRAWINGS

Referring now to the drawings wherein the showings are for the purpose of illustrating preferred embodiments only and not for the prupose of limiting the same.

FIGS. 1-4 show the present invention is essentially composed of a panel 1, attached to the top of a turntable 2, a bracket frame 3 underneath the turntable 2, and a plurality of steel ball bearings 4 in-between the turntable 2 and the bracket frame 3.

Figure 1:
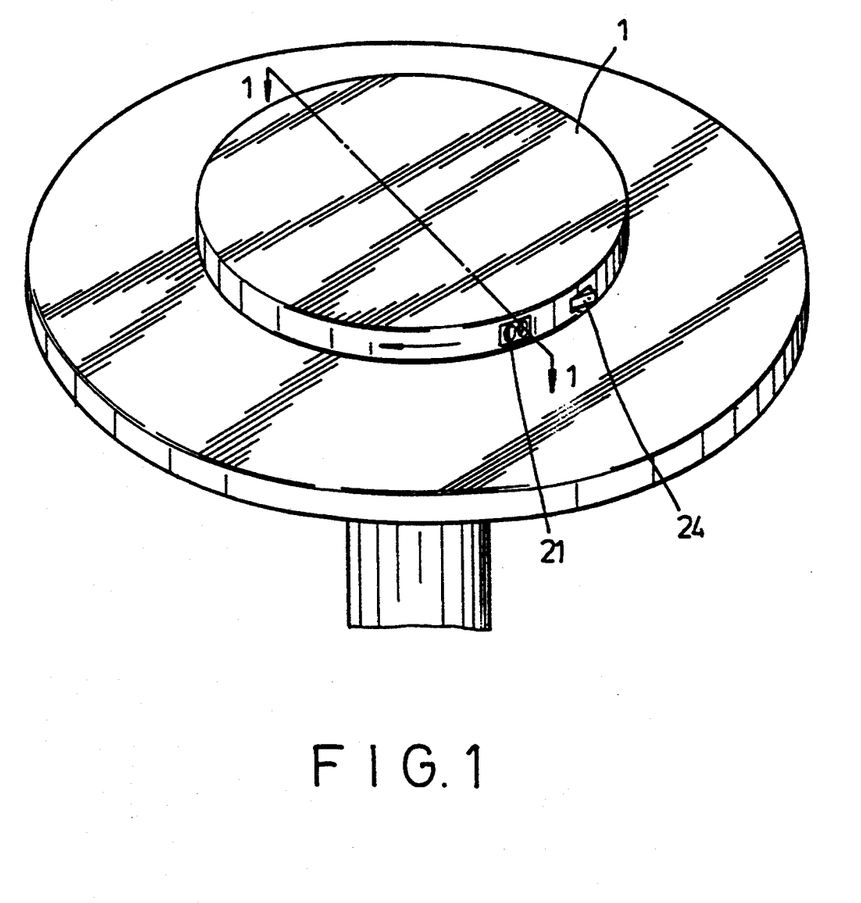
FIG. 1 is a perspective view of a first embodiment of the present invention rotatably mounted on a round table.
Figure 2:
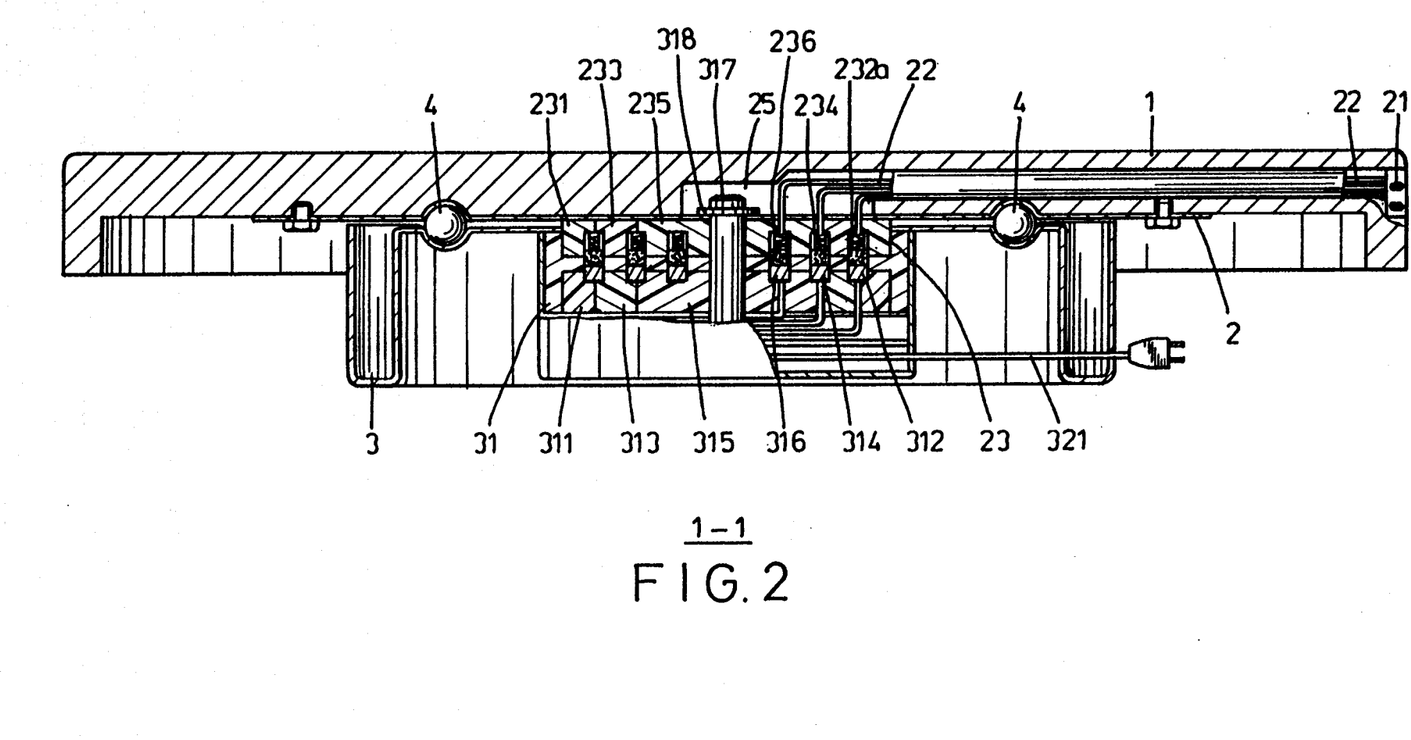
FIG. 2 is a side cross section view taken along line 1—1 of FIG. 1.
Figure 3:
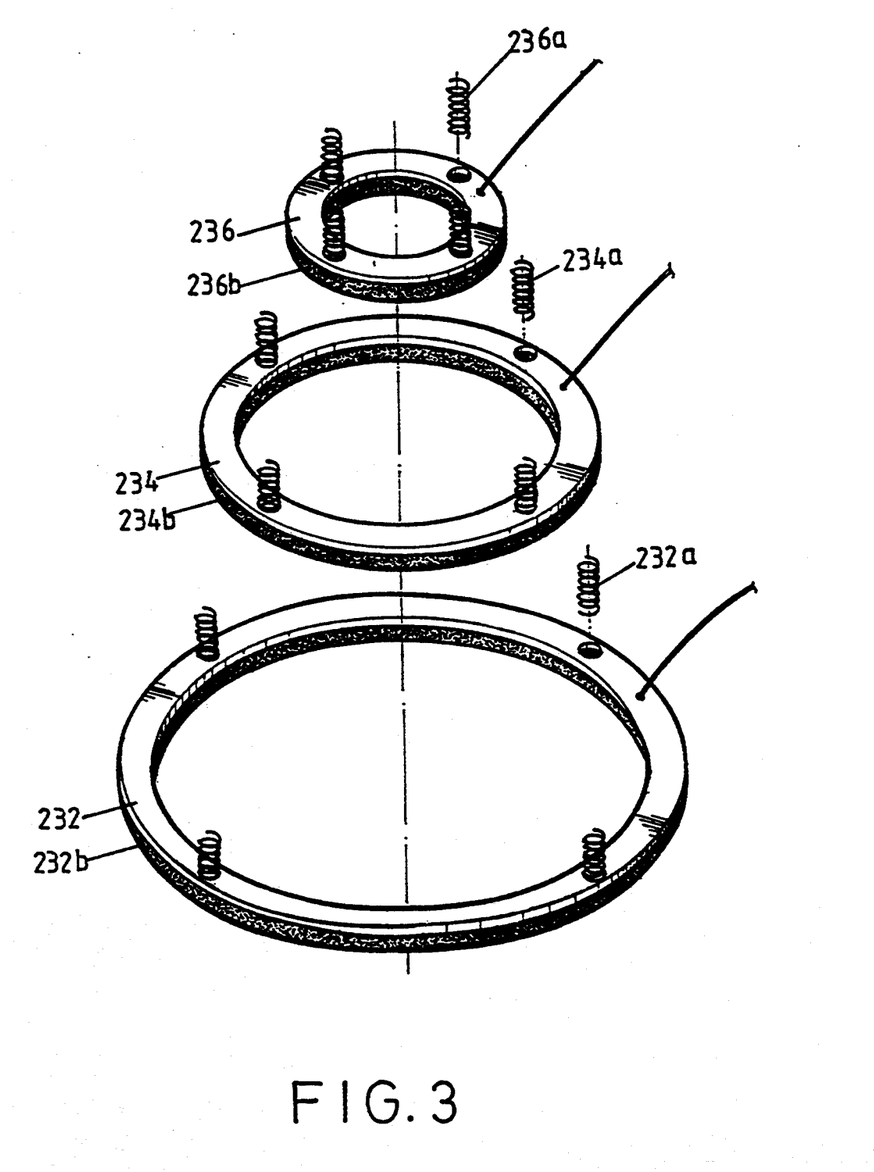
FIG. 3 is a fragmentary view of conductor discs of the present invention.
Figure 4:
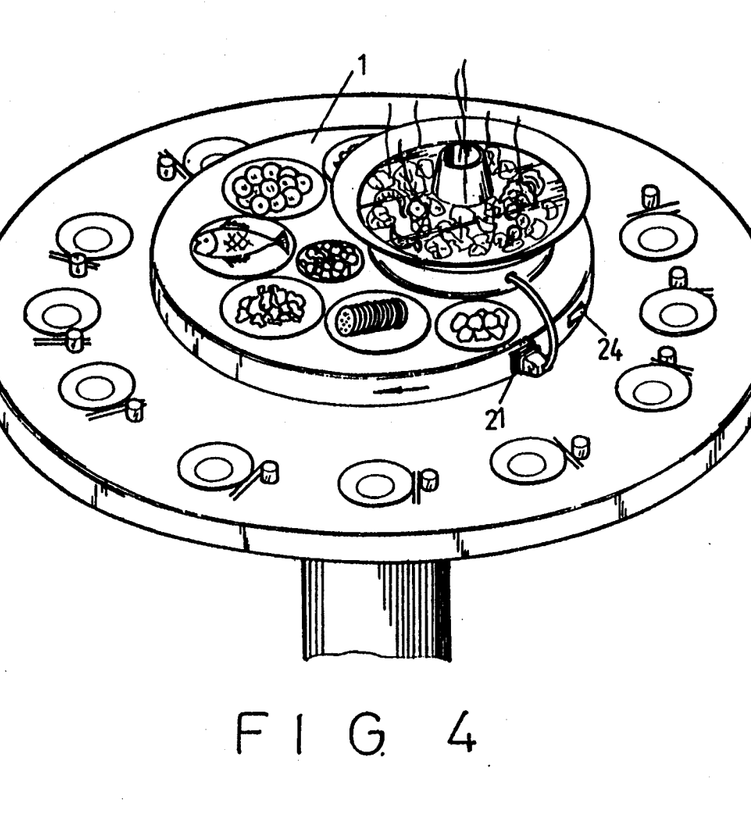
FIG. 4 is a perspctive view of FIG. 1 having a pot seating on top of the turntable with an electrical cord plugged into receptacle of the turtable.

The turntable includes a receptacle 21 at one side having connected to an insulator 23 through electric cord 23 and a switch 24. An aperture 25 is formed at center of the turntable 2. The insulator 23 is isolated by isolation 231 at its outer surface and includes three different sizes of circular conducting discs, 232, 234, and 236 located in-between the insulator 23 and the aperture 25, as shown in FIG. 2. The conducting discs 232, 234, and 236 are isolated by isolators, 233, 235. In FIG. 3 shows the elastic members 232a, 234a, and 236a are resting on to of each conducting disc 232, 234, and 236. Carbonaceous discs 232b, 234b, and 236b are attached to the bottom portion of each conducting disc, respectively.

Figure 13:
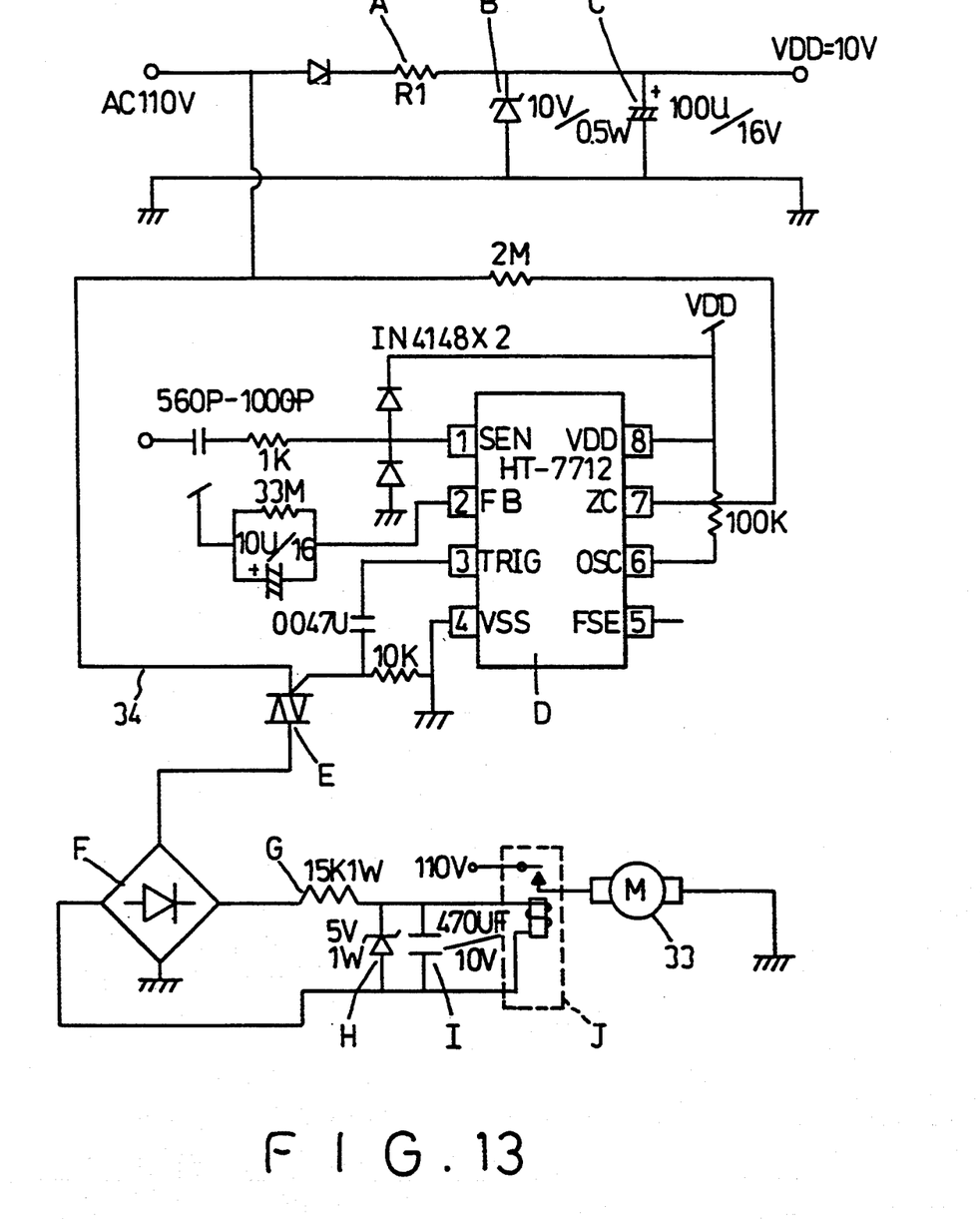
FIG. 13 is an electrical circuitry of a control system of the present invention.

In FIG. 2 shows the bracket frame 3 is also composed of an insulator 31 isolating the bracket frame 3 from outside, conducting discs 312, 314, and 316 seperated by insulators 311 and 313. The insulator 31, the conducting discs 312, 314, 316 and the insulators 311, 313 are aligned each with respect to the insulator 23, the conducting discs 232, 234, 236, and the insulators 233, 235. The bracket frame 3 has a reel 32 (as shown in FIG. 13) to collect an extension cord which has one end being connected to the conducting discs in parallel, respectively. The bracket frame 3 includes a post extending from center and projecting out from the aperture 25. The top portion of the post 317 is clipped by a snap ring 318 in such a manner that the post 317 is restricted from detaching and the turntable 2 is rotatable with respect to the bracket frame 3.

When in use, a fire pot or the like is placed on top of the turntable 2 with an electric plug plugged into an electric receptacle 21 to receive electric power and controlled by a switch 24 to turn on and off.

Figure 5:
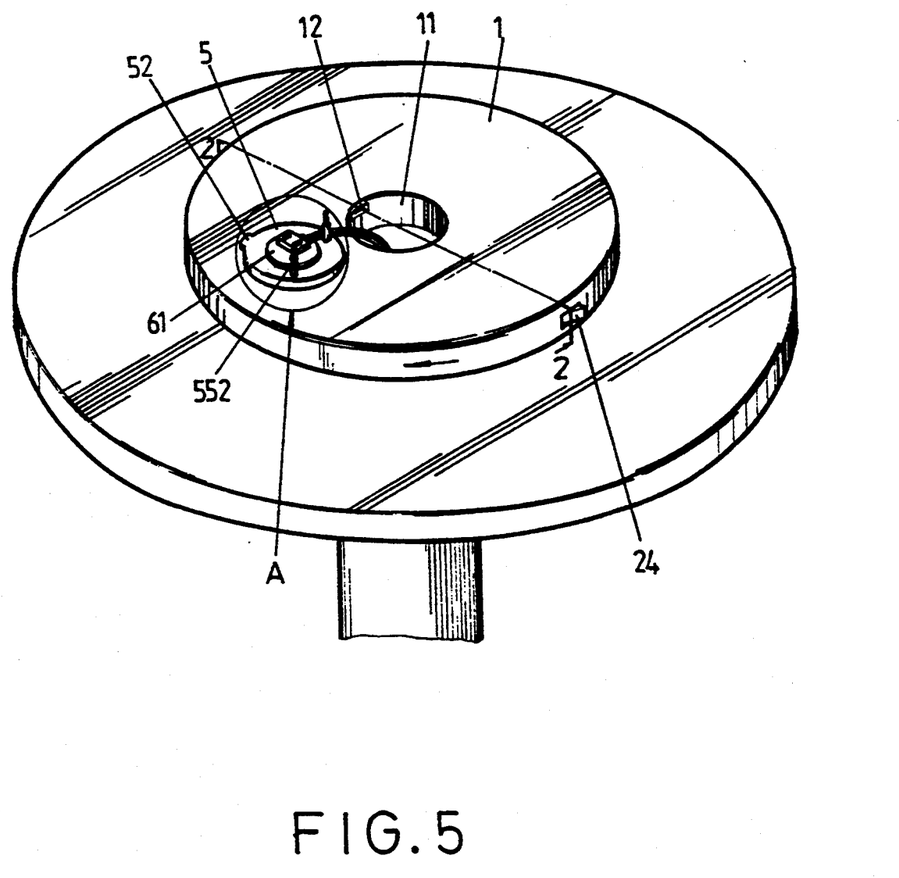
FIG. 5 is a perspective view of a second embodiment of the present invention.
Figure 6:
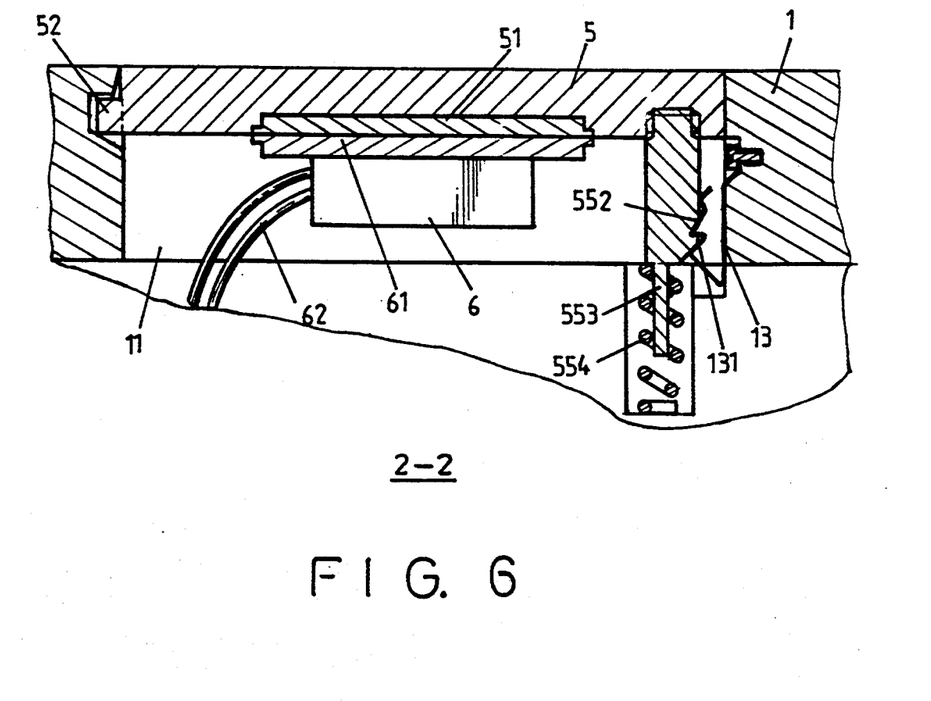
FIG. 6 is a side cross section view taken along line 2—2 of FIG. 5.
Figure 7:
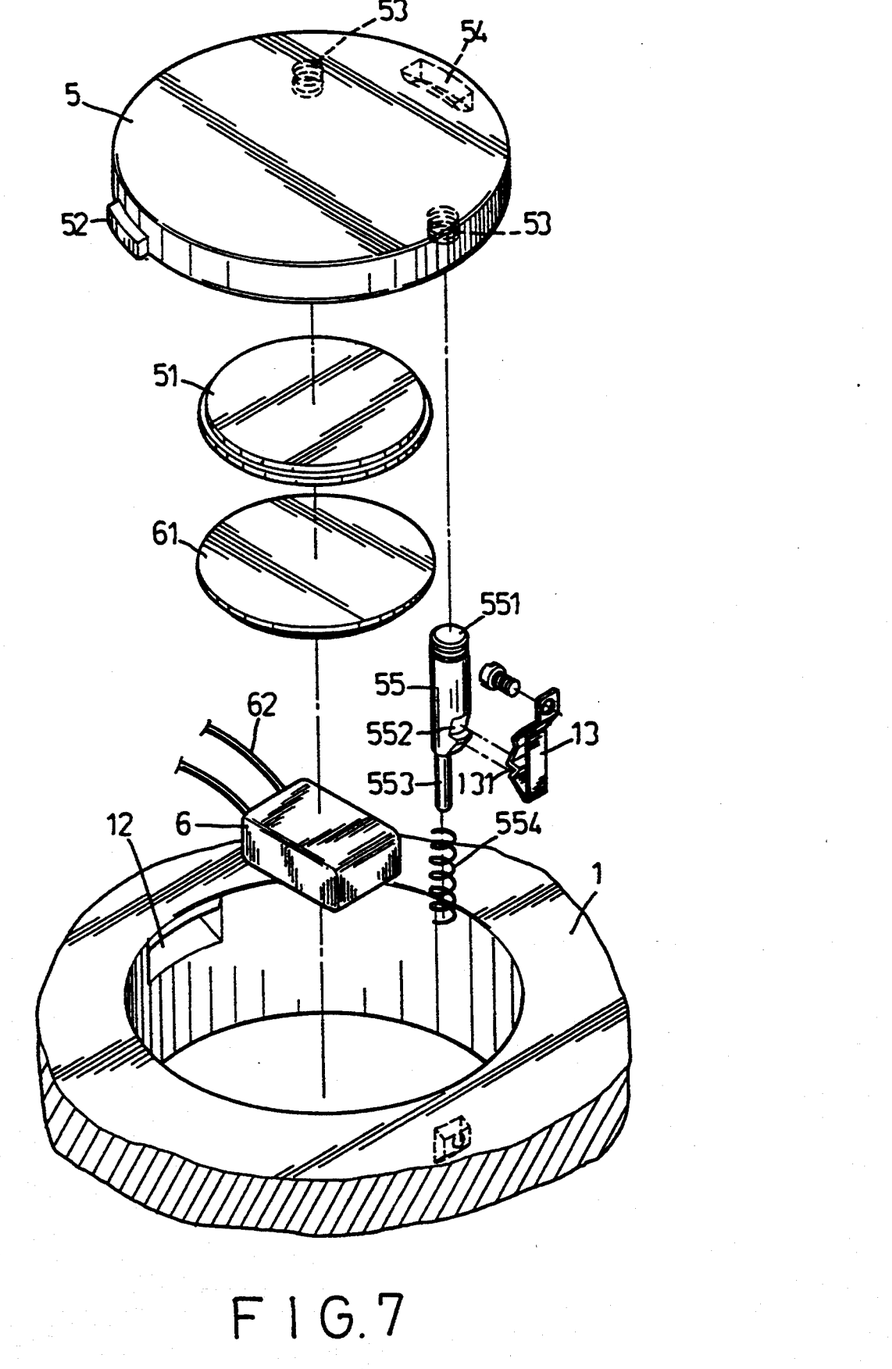
FIG. 7 is an enlarged fragmentary view of circle A of FIG. 5.

A second embodiment of the present invention is shown in FIGS. 5-9. FIG. 5 shows the electric receptacle 21 is moved from one side of the turntable 2 to the inner side of a lid 5 and is given a reference number 6. The lid is received in an aperture 11 of the panel 1. The aperture 11 includes a blind hole 12 and a pair of plate springs 13 on the wall and spaced equally from each other. Each plate spring 13 has a ratchet 131 at one side. FIG. 7 shows The lid 5 has a magnetic plate 51 secured to the center portion, a lug 52 and two female threaded bores 53 at the peripheral corresponding to the blind hole 12 and the plate springs 13, respectively. A notch 54 is formed at the opposite end of the lid 5 and two latches 55 each has a threaded end 551 at top portion adopted to be threaded into the threaded bore 53, a reduce diameter portion 553 at the oposite end to be inserted into a spring 554 which is. A detent 552 at one side tereof adopted to be engaged with the ratchet 131 of the plate spring 13.

The receptacle 6 is attached to a magnetic plate 61 which then attached to the magnetic plate 51 of the lid 5 that will hold the receptacle 6 securely.

Figure 8A:
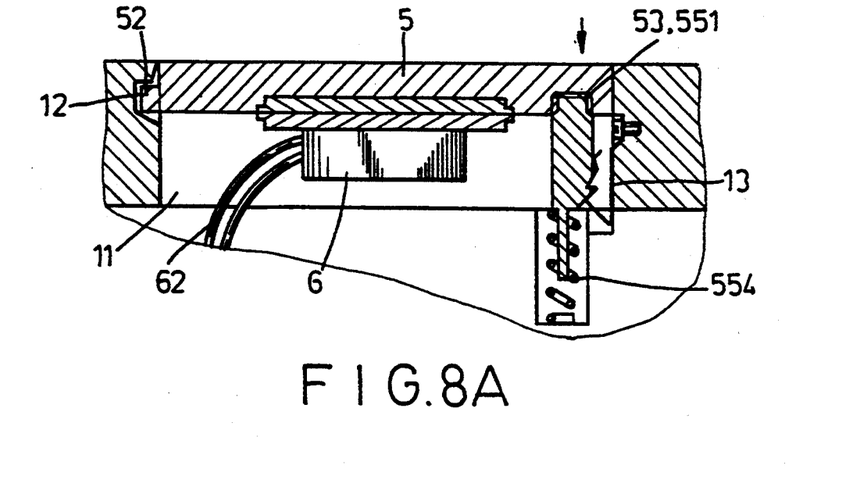
FIGS. 8A, 8B, & 8C are side cross sectional views of circle A of FIG. 5 showing the operation of open the lid.
Figure 8B:
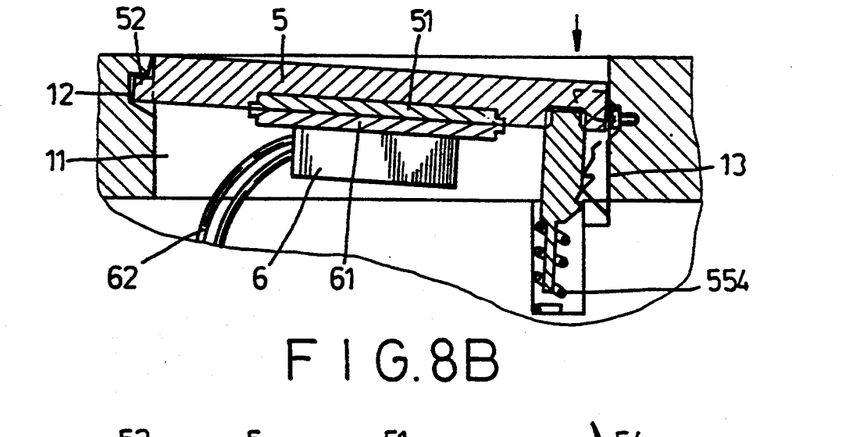
Figure 8C:
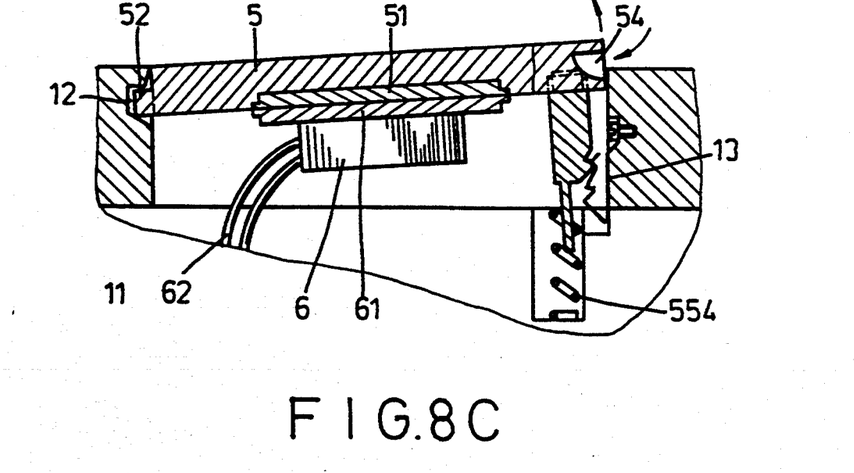
Figure 9:
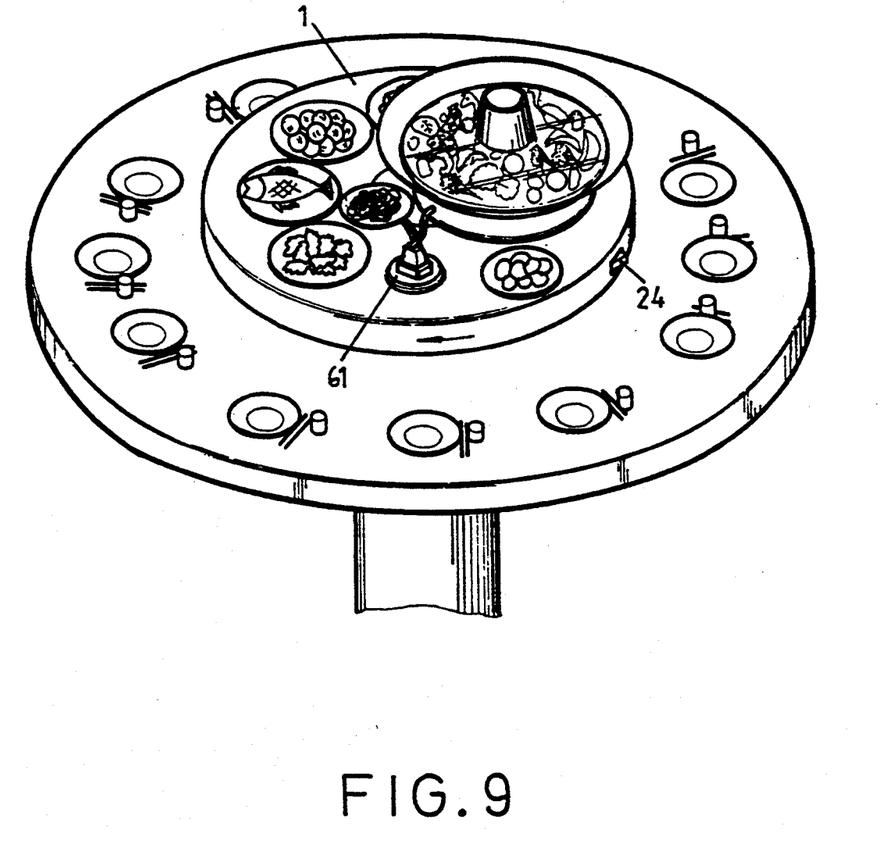
FIG. 9 is a perspective view of FIG. 5 having a pot seating on top thereof with an electrical cord plugged into a receptacle on the turntable.

The lid 5 is formed as a part of the turntable 2. Therefore, when the lid 5 is closed, the receptacle 21 will be hidden underneath the lid 5, as shown in FIG. 6. To open the lid 5, simply press the lid 5 from the end where notch 54 is located downwardly and then release the lid 5 immediately, as shown in FIGS. 8A and 8B. The latches 55 shall press the springs 554 downward and the detent 552 is released from the ratchet 131. Upon the immediate pressing force is released, the springs 554 will push the latches 55 and the lid 5 upwardly, as shown in FIG. 9C. The notch 54 at this moment is located slightly higher than the panel 1 for lifting up purpose. Upon the lid 5 is lifted and disengaged from the aperture 11, turn the lid 5 to the other side so that the receptacle 6 is ready for use.

Figures 10, 12:
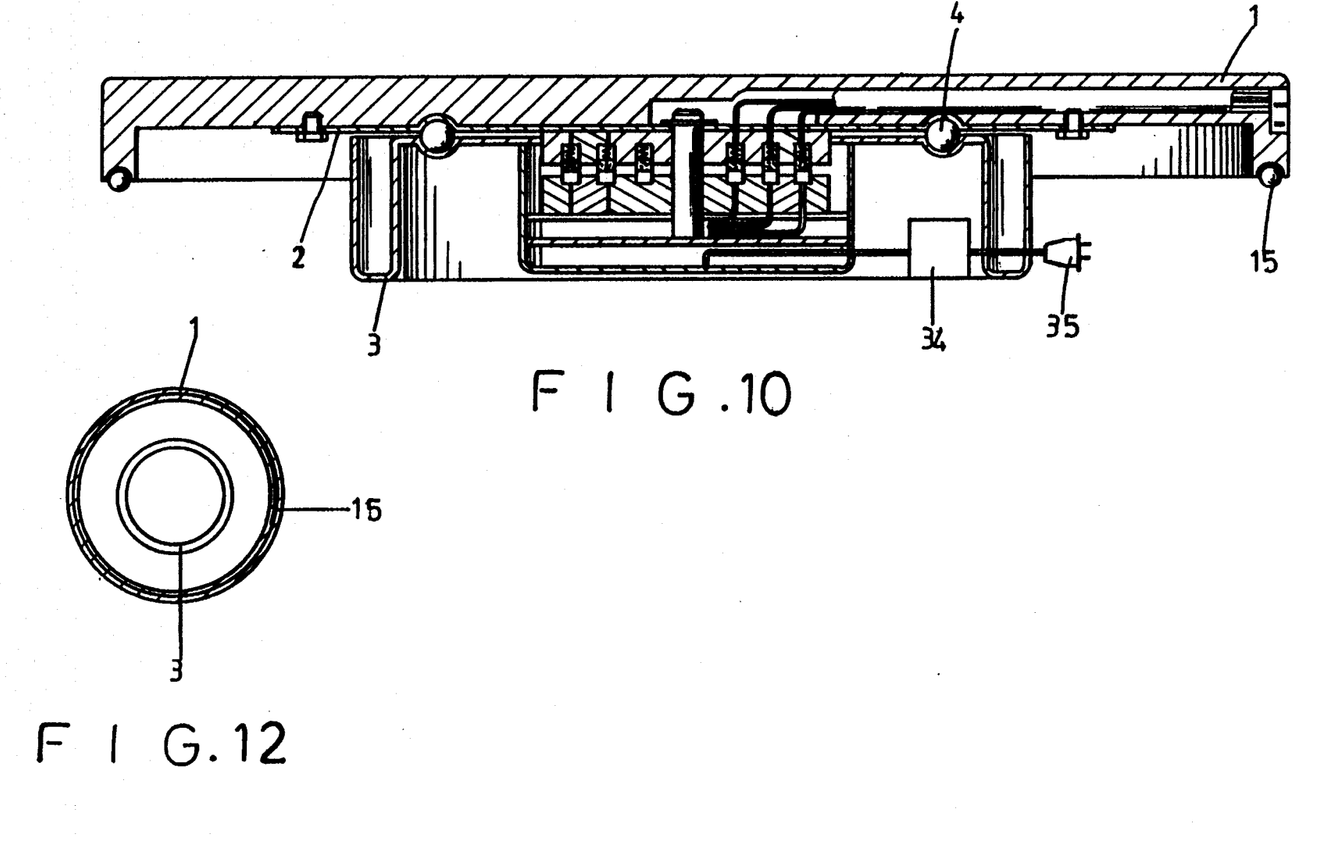
FIG. 10 is a side elevational view of a third embodiment of the present invention.
FIG. 12 is a top sectional view of the third embodiment of the present invenion.

A third embodiment of the present invention, as shown in FIG. 10 is also composed of a panel 1, a turntable 2, a bracket frame 3, and a plurality of steel ball bearings 4.

Figure 11:
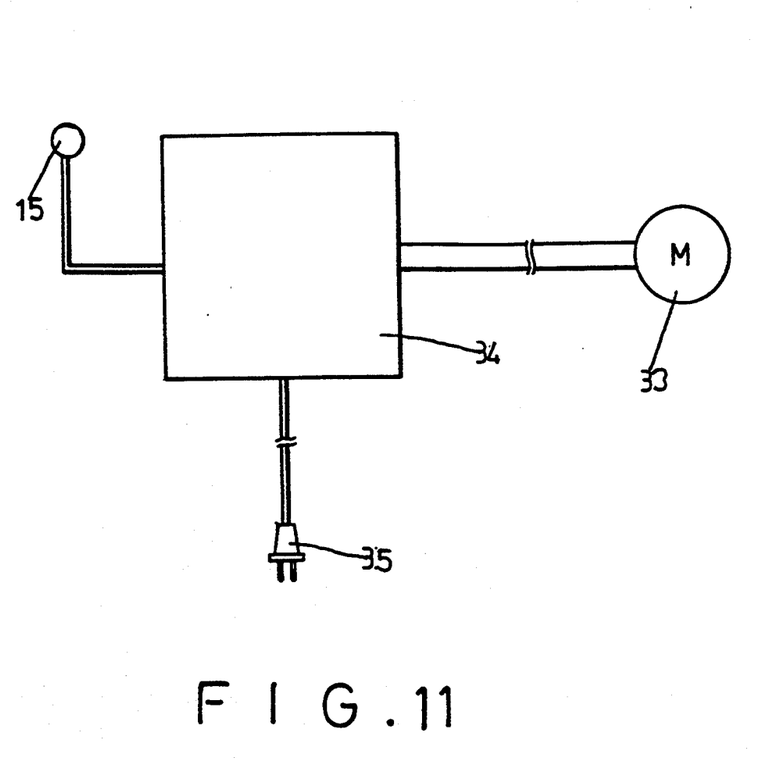
FIG. 11 is a block diagram depicts the controlling system of the present invention.

The panel 1 has a copper inductor 15 attached to the bottom peripheral, as shown in FIG. 12. The bracket frame 3 has an extension cord 35 having one end connected to a control box 33. The control box 33 has an input connected to the copper inductor 15 and an output connected to a motor 34, as shown in FIG. 11.

FIG. 13 is an electric circuitry of the control box 33 which has included a two major portions, an electricity and a mechanics. The electricity includes a half wave rectifier, 1N4004, to rectify input voltage, a stabilizer to stabilize the voltage at 10 V, and a filter to ensure a 10 V Direct Current output to a motor 32. The mechanics portion is mainly formed by an integral circuitHT-7712. Upon the copper inductor 15 senses touched by hand, the foot 3 will send a signal to trigger a three-phase switch E which then transfer a 110 Voltage to a bridge rectifier F, a current limit resistor G, a stabilizer diode H, and a filter capacitor I and output a stable direct current 5 V to drive a relay to produce magnetic field and driving an alternate motor 34. The alternate motor 34 then drives the turntable 2 to rotate. Upon the copper inductor 15 senses touched by hand again, the foot 3 of the integral circuit HT-7712 will stop output signal to the three-phase switch E and the alternate will stop driving the turntable 2 to rotate.

I claim:

1. A turntable equipped with an electrical receptacle comprising:
   a. a table frame having a plurality of second electrically conductive discs mounted therein, said second electrically conductive discs being electrically coupled in parallel relation to an electrical extension cord extending from said table frame;
   b. a table panel having an aperture formed therein, said table panel rotatably mounted on said table frame having at least one electrical receptacle mounted therein and having a plurality of first electrically conductive discs electrically coupled in parallel connection to said electrical receptacle, each of said first electrically conductive discs aligned with a respective one of said second electrically conductive discs, each of said first electrically conductive discs having a carbonaceous bottom section;
   c. spring means for biasing each of said first electrically conductive discs into contiguous contact with an upper surface of a respective one of said second electrically conductive discs for providing an electrical path from said extension cord to said receptacle;
   d. first insulation means located in said table panel for electrically isolating said first electrically conductive discs each from the other;
   e. second insulation means located in said table frame for electrically isolating said second electrically conductive discs each from the other;
   f. a removable lid having a bottom portion and a top portion mounted within said aperture to said table panel, said receptacle being secured to said bottom portion of said removable lid; and,
   g. latch means for releasably securing said removable lid to said table panel within said aperture.

2. A turntable equipped with an electric receptacle of claim 1 wherein:
   a. said table panel includes a central aperture;
   b. said table frame includes an upwardly extending center post;
   c. said center post being disposable through said central aperture when said table panel is placed on top of said bracket frame; and
   d. means for securing said table panel to said table frame.

3. A turntable equipped with an electric receptacle of claim 2 wherein said means for securing includes a snap ring.

4. A turntable equipped with an electric receptacle of claim 1 wherein said table frame includes a reel mounted therein for winding said extension cord.

5. A turntable equipped with an electric receptacle of claim 1 wherein said latch means includes
   a. a lug extending outwardly from the periphery of said lid and a bore formed in an inner wall of said aperture for engagement by said lug;
   b. a pair of threaded bores formed in the bottom portion of said lid;
   c. a pair of posts, each post including a threaded upper end engaged within a threaded bore and a reduced diameter bottom end, a spring sleeved onto said reduced bottom portion of each post; and
   d. a pair of plate springs carried by said table panel, each plate spring including a ratchet detachably engageable with a detent formed in said post.

6. A turntable equipped with an electric receptacle of claim 5 wherein said means for securing said receptacle to said lid includes a magnetic plate carried by said lid and a magnetic plate carried by said receptacle.

7. A turntable equipped with an electric receptacle of claim 1 including
   a. a copper inductor being attached to the bottom periphery of said table panel; and,
   b. control box means having opposing ends respectively connected to said copper inductor and a motor for outputting a signal to actuate and deactuate said motor responsive to a manual actuation of said copper inductor.

* * * * *